United States Patent
Coyne et al.

(10) Patent No.: US 12,525,673 B2
(45) Date of Patent: Jan. 13, 2026

(54) ANTI-FILIFORM CORROSION CHANNELS

(71) Applicant: Ford Global Technologies, LLC, Dearborn, MI (US)

(72) Inventors: Christopher William Coyne, Dearborn, MI (US); Samuel Jeffrey Tomlinson, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 978 days.

(21) Appl. No.: 17/210,812

(22) Filed: Mar. 24, 2021

(65) Prior Publication Data
US 2022/0311080 A1 Sep. 29, 2022

(51) Int. Cl.
*H01M 50/24* (2021.01)

(52) U.S. Cl.
CPC ........ *H01M 50/24* (2021.01); *H01M 2220/20* (2013.01)

(58) Field of Classification Search
CPC ............. H01M 50/24; H01M 2220/20; H01M 50/571; H01M 50/10; H01M 50/102; H01M 10/625; H01M 10/425; H01M 50/204; H01M 50/249; H01M 50/271; H01R 13/533; H01R 2201/26; B60K 2001/0438; B60L 50/64; B60L 50/72
See application file for complete search history.

(56) References Cited

U.S. PATENT DOCUMENTS

| | | | | |
|---|---|---|---|---|
| 6,177,189 | B1* | 1/2001 | Rawlings | C09J 7/22 |
| | | | | 156/304.3 |
| 8,833,499 | B2* | 9/2014 | Rawlinson | H01M 50/213 |
| | | | | 180/68.5 |
| 8,967,312 | B2* | 3/2015 | Yanagi | H01M 50/204 |
| | | | | 180/68.5 |
| 10,476,060 | B1* | 11/2019 | Smith | H01M 50/249 |
| 10,553,837 | B2* | 2/2020 | Yang | H01M 50/169 |
| 11,211,656 | B2* | 12/2021 | Matecki | H01M 50/271 |
| 2007/0065645 | A1 | 3/2007 | Steinbock et al. | |
| 2014/0322565 | A1* | 10/2014 | Kusama | H01M 50/191 |
| | | | | 429/185 |
| 2015/0147639 | A1* | 5/2015 | Uchida | H01M 10/6556 |
| | | | | 429/185 |
| 2015/0377355 | A1* | 12/2015 | Coenegracht | G02B 6/4444 |
| | | | | 312/223.4 |

(Continued)

FOREIGN PATENT DOCUMENTS

DE 102016013928 A1 6/2017
DE 102019004551 A1 12/2019
(Continued)

*Primary Examiner* — Eric S Ruppert
*Assistant Examiner* — Gustavo A Hincapie Serna
(74) *Attorney, Agent, or Firm* — David B. Kelley; Carlson, Gaskey & Olds, P.C.

(57) ABSTRACT

An apparatus and method for reducing filiform corrosion in vehicle joint architectures, according to an exemplary aspect of the present disclosure includes, among other things, a first component having a first surface, a second component having a second surface facing the first surface, and a channel formed within the first component and open to the first surface. A seal member is positioned between the first and second surfaces to provide a seal interface, and the seal member is positioned to cover the channel.

22 Claims, 4 Drawing Sheets

(56) References Cited

U.S. PATENT DOCUMENTS

| | | | |
|---|---|---|---|
| 2019/0379154 A1* | 12/2019 | Nishijima | H01R 13/748 |
| 2020/0052252 A1* | 2/2020 | Smith | H01M 50/184 |
| 2020/0251698 A1* | 8/2020 | Paramasivam | H01M 10/613 |
| 2021/0262571 A1* | 8/2021 | Ono | F16J 15/102 |
| 2022/0093940 A1* | 3/2022 | Matsuda | H01M 8/0202 |
| 2022/0209347 A1* | 6/2022 | Park | H01M 50/20 |
| 2022/0278388 A1* | 9/2022 | Votteler | H01M 10/613 |
| 2022/0294047 A1* | 9/2022 | Pethick | H01M 50/227 |
| 2022/0302523 A1* | 9/2022 | Cook | H01M 10/6556 |
| 2023/0344035 A1* | 10/2023 | Park | H01M 50/502 |
| 2024/0047803 A1* | 2/2024 | Ma | B32B 27/42 |
| 2024/0079704 A1* | 3/2024 | Lee | H01M 50/249 |

FOREIGN PATENT DOCUMENTS

| | | | | |
|---|---|---|---|---|
| JP | 5590210 B1 * | 9/2014 | | |
| JP | 6141103 B2 * | 6/2017 | | H01M 8/0247 |
| WO | 2004037509 A1 | 5/2004 | | |
| WO | WO-2016006393 A1 * | 1/2016 | | F16J 15/061 |

\* cited by examiner

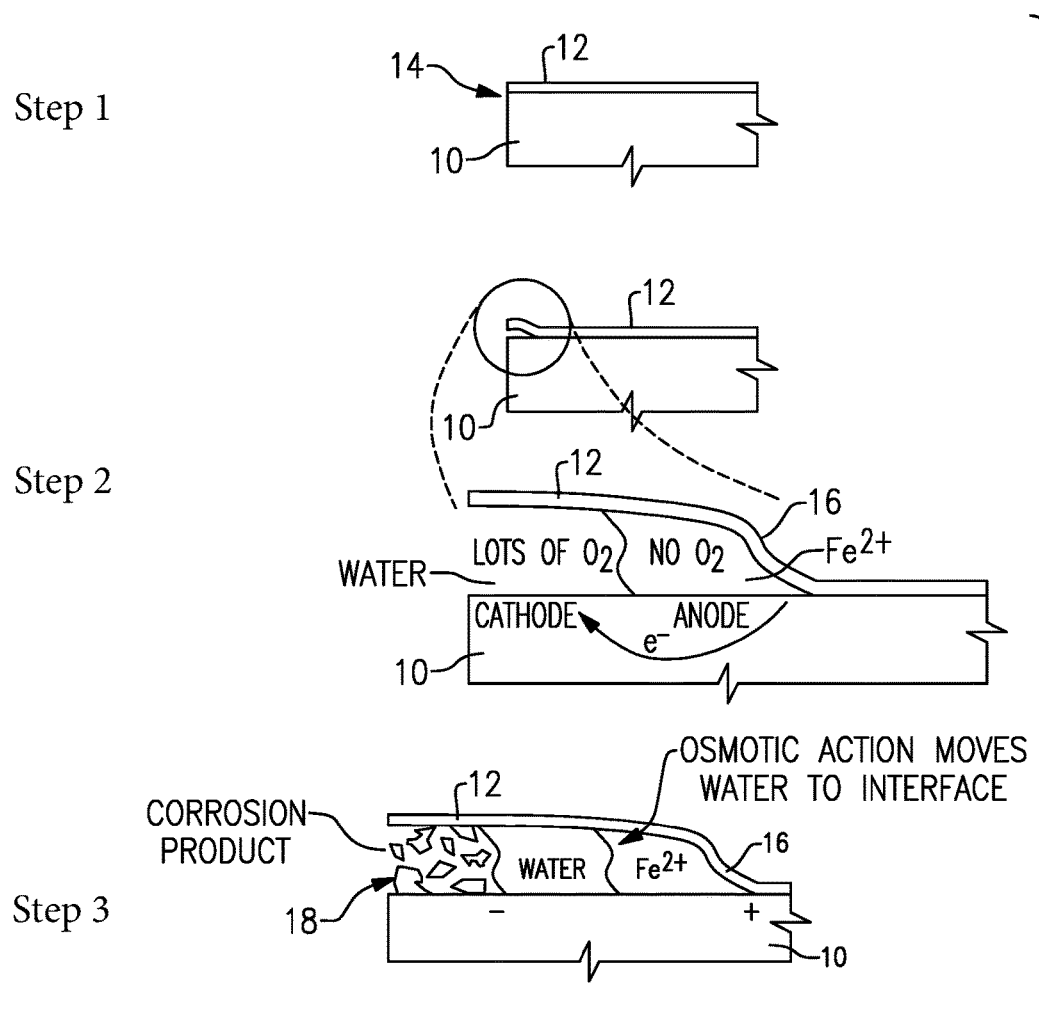

ANTI-FILIFORM CORROSION CHANNELS

TECHNICAL FIELD

This disclosure is directed to reducing filiform corrosion in vehicle joint architectures such as in joints for a high voltage traction battery, for example.

BACKGROUND

Electrified vehicles equipped with high-voltage battery packs are subject to a variety of environmental conditions. For example, the high-voltage battery packs can be subjected to temperatures that can be less than 60° C. Such low temperatures can provide conditions for filiform corrosion to propagate at joint areas.

SUMMARY

An apparatus according to an exemplary aspect of the present disclosure includes, among other things, a first component having a first surface, a second component having a second surface facing the first surface, and a channel formed within the first component and open to the first surface. A seal member is positioned between the first and second surfaces to provide a seal interface, and wherein the seal member is positioned to cover the channel.

In a further non-limiting embodiment of the foregoing apparatus, the channel has an enclosed end and an open end that is open to the first surface, and wherein the seal member covers the open end.

In a further non-limiting embodiment of any of the foregoing apparatus, the seal member does not fill the channel.

In a further non-limiting embodiment of any of the foregoing apparatus, the channel has a pair of opposing wall surfaces that extend from a bottom channel surface at the enclosed end to the first surface at the open end.

In a further non-limiting embodiment of any of the foregoing apparatus, the first surface comprises a flat surface extending between first and second edges, and wherein the channel is spaced apart from the first and second edges.

In a further non-limiting embodiment of any of the foregoing apparatus, the seal member is a gasket.

In a further non-limiting embodiment of any of the foregoing apparatus, the first component comprises a battery tray and the second component comprises a cover.

In a further non-limiting embodiment of any of the foregoing apparatus, the first surface comprises a sealing land, and wherein the channel comprises an anti-filiform corrosion channel that provides an air pocket to interrupt filiform corrosion extending inward from an edge of the sealing land.

In a further non-limiting embodiment of any of the foregoing apparatus, the sealing land comprises a non-coated surface.

An apparatus, according to yet another exemplary aspect of the present disclosure includes, among other things, a battery tray having a first surface, a cover having a second surface facing the first surface, and an anti-filiform corrosion channel formed within the battery tray. The anti-filiform corrosion channel has an enclosed end and an open end that is open to the first surface. A gasket is positioned between the first and second surfaces to provide a seal interface, and wherein the gasket is positioned to cover the open end of the anti-filiform corrosion channel.

In a further non-limiting embodiment of any of the foregoing apparatus, the gasket does not fill the anti-filiform corrosion channel such that the anti-filiform corrosion channel provides an open air pocket.

In a further non-limiting embodiment of any of the foregoing apparatus, the anti-filiform corrosion channel has a polygonal cross-section with a pair of opposing wall surfaces that extend from a bottom channel surface at the enclosed end to the first surface at the open end.

In a further non-limiting embodiment of any of the foregoing apparatus, the first surface comprises a flat surface extending between first and second edges, and wherein the anti-filiform corrosion channel is spaced apart from the first and second edges to interrupt filiform corrosion extending inward from one of the first and second edges.

In a further non-limiting embodiment of any of the foregoing apparatus, the battery tray is configured to support a plurality of high voltage traction batteries, and wherein the battery tray comprises a base wall with a plurality of side walls extending outwardly from peripheral edges of the base wall, and wherein at least one side wall includes a sealing land at an upper edge area of the at least one side wall, and wherein the sealing land comprises the first surface, and wherein the cover compresses the gasket between the sealing land and the second surface when attached to the battery tray.

In a further non-limiting embodiment of any of the foregoing apparatus, the anti-filiform corrosion channel is centrally located on the sealing land.

A method according to still another exemplary aspect of the present disclosure includes, among other things, providing a battery tray having a first surface, a cover having a second surface facing the first surface, and a gasket positioned between the first and second surfaces to provide a seal interface. Additional steps include: forming an anti-filiform corrosion channel within the battery tray such that the anti-filiform corrosion channel has an enclosed end and an open end that is open to the first surface; positioning the gasket to cover the open end of the anti-filiform corrosion channel; and attaching the cover to the battery tray to compress the gasket between the first and second surfaces.

In a further non-limiting embodiment of the foregoing method, the gasket does not fill the anti-filiform corrosion channel such that the anti-filiform corrosion channel provides an open air pocket.

In a further non-limiting embodiment of any of the foregoing methods, the method includes forming the first surface as a flat surface extending between first and second edges, and spacing the open end of the anti-filiform corrosion channel apart from the first and second edges to interrupt filiform corrosion extending inward from one of the first and second edges.

In a further non-limiting embodiment of any of the foregoing methods, the battery tray is configured to support a plurality of high voltage vehicle batteries, and the method includes forming the battery tray to have a base wall with a plurality of side walls extending outwardly from peripheral edges of the base wall, and forming a sealing land at an upper edge area of at least one side wall to provide the first surface.

In a further non-limiting embodiment of any of the foregoing methods, the method includes positioning the anti-filiform corrosion channel in a generally central location on the sealing land.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates an example of the steps of development of filiform corrosion on a steel substrate.

DETAILED DESCRIPTION

Figure 2A:
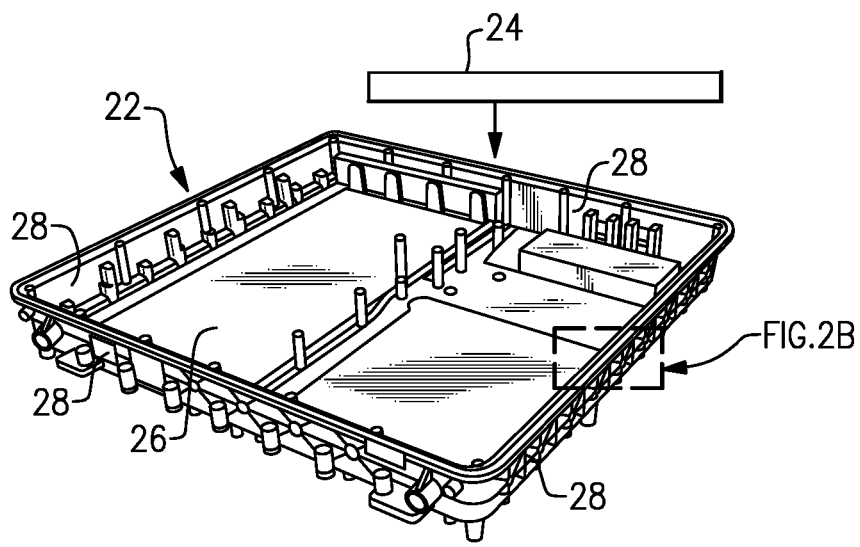
FIG. 2A is a perspective view of a battery tray for a high-voltage battery pack for an electrified vehicle.

This disclosure details an exemplary apparatus and method for reducing filiform corrosion in joint areas for electrified vehicles. Specifically, this disclosure focuses on filiform corrosion at the high-voltage (HV) traction battery (TB) perimeter joint architecture; however, the disclosure could be extended to any vehicle joint architecture.

Electrified vehicles equipped with high-voltage battery packs are subject to a variety of environmental conditions, which can lead to corrosion that increases over a lifetime of the vehicle. One example of corrosion is referred to as crevice corrosion. This type of corrosion is formed on a metal surface near a gap or crevice created between two joining surfaces of a joint interface. Crevice corrosion is initiated by retention of a stagnant solution that infiltrates the gap. This sets up a differential concentration of a particular chemical constituent, e.g. oxygen $O_2$, which further results in an electrochemical concentration cell, which drives a shift to acidic conditions within the crevice, and the buildup of chloride ions in the crevice can lead to crevice corrosion in an autocatalytic reaction.

Another example of corrosion is referred to as filiform corrosion. An example of the steps of development of filiform corrosion on a steel substrate 10 having a coating 12 is shown in FIG. 1. The underlying mechanics of filiform corrosion are very similar to those inherent in crevice corrosion. Instead of a stagnant solution, however, humidity in the air provides water to a corrosion site 14 at an edge of the substrate 10 (step one). Water travels to the front of a corrosion head 16 via osmotic action (step two), and then a differential aeration cell causes aggressive localized corrosion in the form of filiform corrosion trails 18 (step three). The subject disclosure provides for the disruption of the underlying mechanisms fueling filiform corrosion, thereby preventing further travel of corrosion on the sealing surface.

Figure 2B:
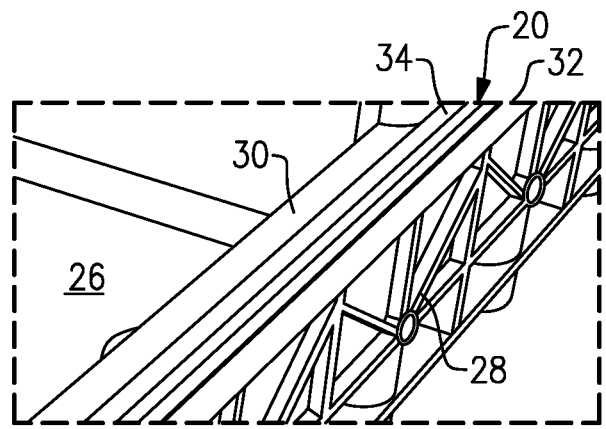
FIG. 2B is an enlarged detail of a portion of the battery tray as identified in FIG. 2A.
Figure 2C:
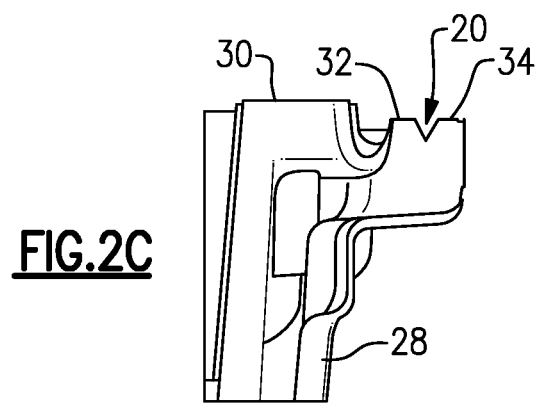
FIG. 2C is a section view of a sealing land of the battery tray of FIG. 2A.

In one example shown in FIGS. 2A-2C, an anti-filiform corrosion channel (AFCC) 20 (FIG. 2C) is formed within, or cut into, a sealing surface of a joint architecture. In one example, the joint is included as part of a battery tray 22 (FIG. 2A) that is configured to support a plurality of high voltage traction batteries (HVTB) shown schematically at 24. The battery tray 22 comprises a base wall 26 with a plurality of side walls 28 extending outwardly from peripheral edges of the base wall 26. The side walls 28 include an upper edge area 30 with a lip or rim 32 (FIG. 2B) that extends outwardly away from the side wall 28. The rim 32 includes a first surface comprising a sealing land 34 as shown in FIG. 2C.

Figure 3:
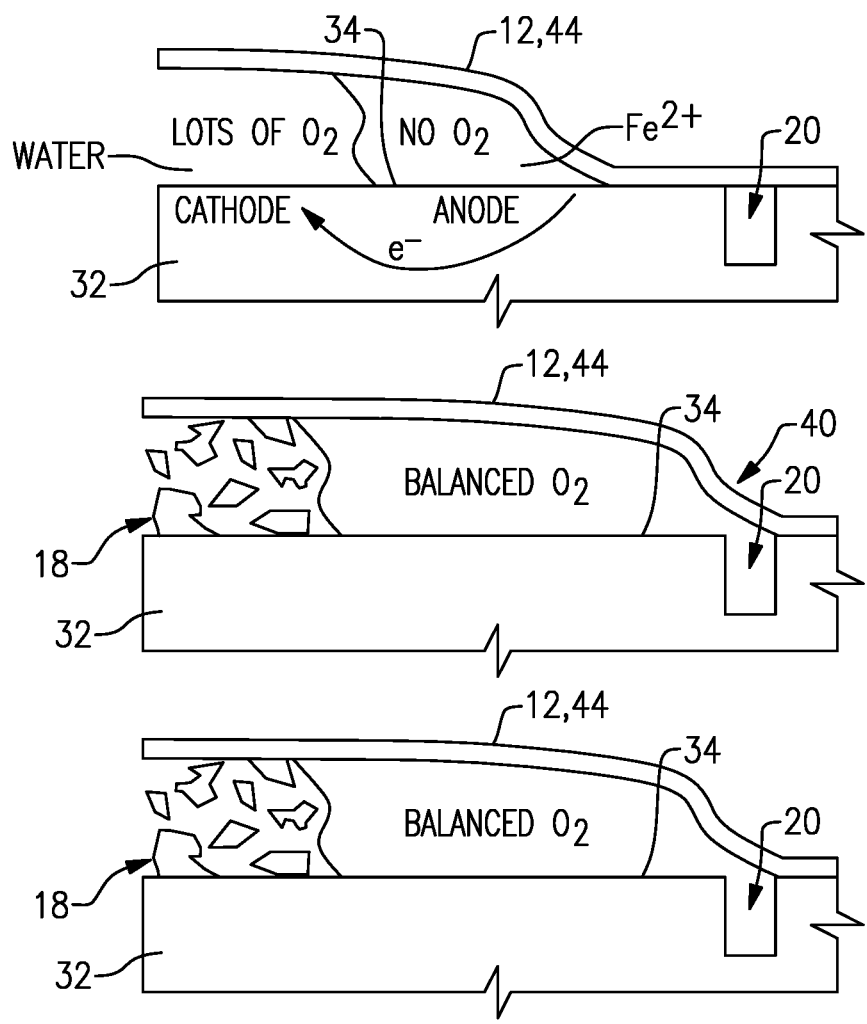
FIG. 3 shows an anti-filiform corrosion channel that interrupts the formation of filiform corrosion.

In one example, the AFCC 20 is formed within the sealing land 34. The AFCC 20 serves two main purposes. First, the AFCC 20 temporarily eliminates the differential aeration cell as shown in FIG. 3. As soon as the filiform corrosion trails 18 meet the AFCC 20 as indicated at 40, the oxygen imbalance is eliminated, the differential aeration cell is deconstructed, and the cathodic and anodic reactions both occur at the head 16 of the corrosion trail 18. This negates the autocatalytic behavior of filiform corrosion acting otherwise unimpeded beneath the coating 12. Therefore, when the filiform corrosion trails 18 reach the AFCC 20, they will stop or significantly slowdown in advancing across the sealing surface of the sealing land 34.

Second, the distance that the filiform corrosion trail 18 must travel is increased between the internal and external areas of the HVTB 24. Instead of traveling straight across the sealing land 34, the trail 18 must travel along the walls of the channel itself before reaching an opposite side of the land 34. Thus, the time it takes for filiform corrosion to travel across the sealing land 34 is significantly increased.

Figure 4A:
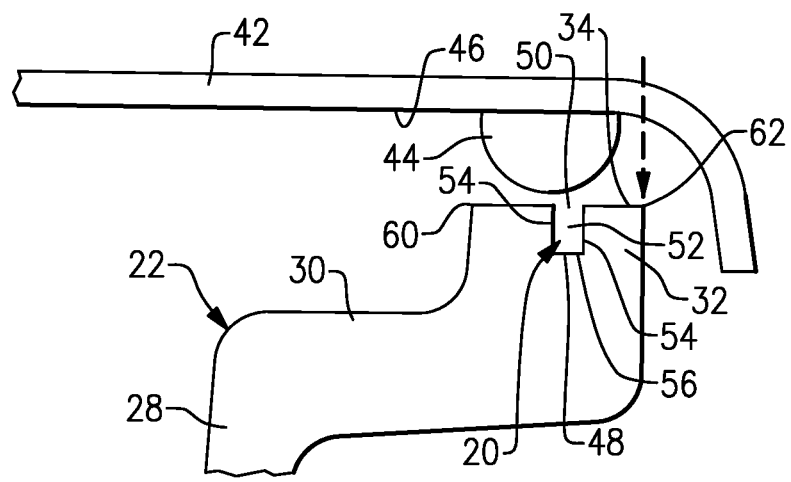
FIG. 4A shows a cross-sectional view of a cover and gasket prior to assembly to a battery tray.
Figure 4B:
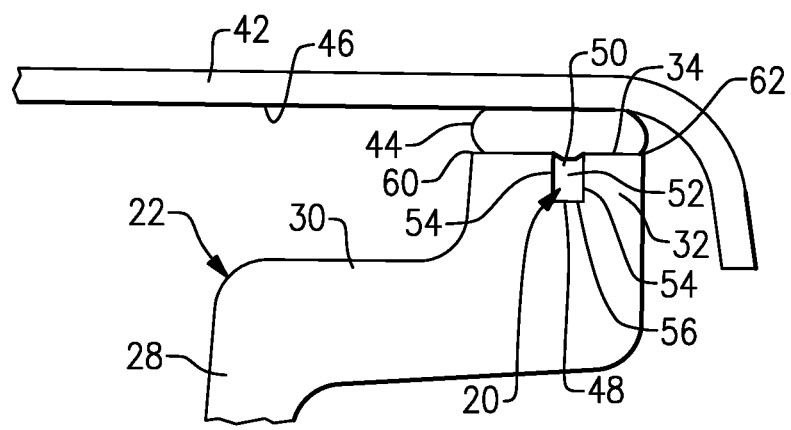
FIG. 4B shows the cover, gasket, and battery tray as assembled.

It has been observed that in a joint architecture with a seal member, the seal acts effectively as a "coating", and the joint is subject to filiform corrosion. FIGS. 4A-4B show an example of a battery tray 22 with a seal member between the sealing land 34 and a cover 42. In one example, the seal member is a gasket 44; however other type of sealing members could also be used. The battery tray 22 has a first surface comprising the sealing land 34 and the cover 42 has a second surface 46 facing the sealing land 34. The AFCC 20 is formed within the rim 32 of the battery tray 22 and has an enclosed end 48 and an open end 50 that is open to the outer surface of the sealing land 34. The gasket 44 is positioned between the sealing land 34 and the surface 46 of the cover 42 to provide a seal interface. The gasket 44 is positioned to cover the open end 50 of the AFCC 20 as shown in FIG. 4B.

In one example, the gasket 44 does not fill the AFCC 20 such that the AFCC 20 provides an open air pocket 52. A portion of the gasket 44 may protrude slightly into the AFCC 20; however, a significant portion of the AFCC 20 remains free from gasket material to provide the open air pocket 52.

In one example, the AFCC 20 has a polygonal cross-section with a pair of opposing wall surfaces 54 that extend from a bottom channel surface 56 at the enclosed end 48 to the outer surface of the sealing land 34 at the open end 50. In the example shown in FIGS. 4A-4B, the cross-section is rectangular; however, the cross-section could also be square, triangular, or curved. Further, the depth and height of the AFCC 20 can be varied as needed dependent upon application and/or manufacturing requirements.

In one example, the outer surface of the sealing land 34 comprises a flat surface extending between first 60 and second edges 62. The AFCC 20 is spaced apart from the first 60 and second 62 edges to interrupt filiform corrosion extending in a direction from one of the first 60 and second 62 edges toward the other of the first 60 and second 62 edges. In one example, the AFCC 20 is centrally located on the sealing land 34.

In one example, the sealing land outer surface comprises a non-coated surface. This means that the gasket 44 is the only sealing structure between the rim 32 and the cover 42.

In one example, prior to assembling the cover 42 to the battery tray, the gasket 44 is adhered or otherwise attached to the surface 46 of the cover 42 as shown in FIG. 4A. The cover 42 then moves downwardly toward the battery tray 22 for assembly. The gasket 44 contacts both sides of the AFCC 20 and the surface of the sealing land 34 once the cover 42 is assembled to the battery tray 22. In this state, the gasket 44 is compressed but does not fill the AFCC 20. This allows the AFCC 20 to maintain an oxygen reservoir. As soon as a filiform corrosion trail 18 (FIG. 3) meets the AFCC 20, the oxygen imbalance is eliminated and the filiform corrosion trail 18 is interrupted. Thus, when the filiform corrosion trail 18 reaches the AFCC 20, filiform corrosion will stop or significantly slowdown in advancing across the sealing land 34 in a manner sufficient to last the lifetime of the vehicle.

The subject disclosure provides a joint architecture with an AFCC 20 that provides several benefits. Filiform corrosion is eliminated or mitigated at a seal interface of a joint architecture. No additional coatings are required and a hard sealing joint is maintained. The disclosed AFCC 20 is particularly useful in joint architectures for HVBPs 24; however, the AFCC 20 can be used in other joint architectures as well. Additionally, breaching of the corrosion trustmark is prevented and weight is reduced.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
a first component having a first surface;
a second component having a second surface facing the first surface, wherein the first component comprises a battery tray and the second component comprises a cover;
a channel formed within the first component and open to the first surface, wherein the channel has an enclosed end providing a bottom channel surface; and
a seal member positioned between the first and second surfaces to provide a seal interface, and wherein the seal member is positioned to cover the channel from one side of the channel to an opposite side of the channel, and wherein the seal member contacts the first surface along the sides of the channel and has an outermost bottom surface that is spaced apart from the bottom channel surface at the channel.

2. The apparatus according to claim 1, wherein the channel has an open end that is open to the first surface, and wherein the seal member covers the open end.

3. The apparatus according to claim 2, wherein the seal member does not fill the channel.

4. The apparatus according to claim 2, wherein the channel has a pair of opposing wall surfaces that extend from the bottom channel surface at the enclosed end to the first surface at the open end.

5. The apparatus according to claim 1, wherein:
the first surface comprises a flat surface extending between first and second edges;
the channel is spaced apart from the first and second edges; and
sealing material of the seal member is sandwiched between the first surface and the second surface along the sides of the channel such that the first component is spaced apart from the second component along the sides.

6. The apparatus according to claim 1, wherein the seal member is a gasket.

7. The apparatus according to claim 1, wherein the first surface comprises a sealing land, and wherein the channel comprises an anti-filiform corrosion channel that provides an air pocket to interrupt filiform corrosion extending inward from an edge of the sealing land, wherein the air pocket forms an unfilled area between the outermost bottom surface of the seal member, the bottom channel surface, and side walls of the anti-filiform corrosion channel.

8. The apparatus according to claim 7, wherein the sealing land comprises a non-coated surface.

9. An apparatus, comprising:
a battery tray having a first surface;
a cover having a second surface facing the first surface;
an anti-filiform corrosion channel formed within the battery tray, the anti-filiform corrosion channel having an enclosed end that provides a bottom channel surface and an open end that is open to the first surface; and
a gasket positioned between the first and second surfaces to provide a seal interface, and wherein the gasket is positioned to cover the open end of the anti-filiform corrosion channel from one side of the anti-filiform corrosion channel to an opposite side of the anti-filiform corrosion channel, and wherein the gasket is positioned to contact the first surface along both the sides of the anti-filiform corrosion channel to cover the open end of the anti-filiform corrosion channel, and wherein an outermost bottom surface of the gasket is spaced apart from the bottom channel surface at the anti-filiform corrosion channel.

10. The apparatus according to claim 9, wherein the gasket does not fill the anti-filiform corrosion channel such that the anti-filiform corrosion channel provides an air pocket, wherein the air pocket forms an unfilled area between the outermost bottom surface of the gasket, the bottom channel surface, and side walls of the anti-filiform corrosion channel.

11. The apparatus according to claim 9, wherein the anti-filiform corrosion channel has a polygonal cross-section with a pair of opposing wall surfaces that extend from a bottom channel surface at the enclosed end to the first surface at the open end.

12. The apparatus according to claim 9, wherein the first surface comprises a flat surface extending between first and second edges, and wherein the anti-filiform corrosion channel is spaced apart from the first and second edges to interrupt filiform corrosion extending inward from one of the first and second edges, and wherein gasket material is sandwiched between the first surface and the second surface along the sides of the anti-filiform corrosion channel such that the cover is spaced apart from the battery tray along the sides.

13. The apparatus according to claim 12, wherein the battery tray is configured to support a plurality of high voltage traction batteries, and wherein the battery tray comprises a base wall with a plurality of side walls extending outwardly from peripheral edges of the base wall, and wherein at least one side wall includes a sealing land at an upper edge area of the at least one side wall, and wherein the sealing land comprises the first surface, and wherein the cover compresses the gasket between the sealing land and the second surface when attached to the battery tray.

14. The apparatus according to claim 13, wherein the anti-filiform corrosion channel is centrally located on the sealing land.

15. A method comprising:
providing a battery tray having a first surface, a cover having a second surface facing the first surface, and a gasket positioned between the first and second surfaces to provide a seal interface;
forming an anti-filiform corrosion channel within the battery tray such that the anti-filiform corrosion channel has an enclosed end forming a bottom channel surface and an open end that is open to the first surface;
positioning the gasket to cover the open end of the anti-filiform corrosion channel from one side of the anti-filiform corrosion channel to an opposite side of the anti-filiform corrosion channel;
positioning the gasket to contact the first surface along both the sides of the anti-filiform corrosion channel to cover the open end of the anti-filiform corrosion channel;
spacing an outermost bottom surface of the gasket that overlaps the anti-filiform corrosion channel away from the bottom channel surface; and
attaching the cover to the battery tray to compress the gasket between the first and second surfaces.

16. The method according to claim 15, wherein the gasket does not fill the anti-filiform corrosion channel such that the anti-filiform corrosion channel provides an air pocket, wherein the air pocket forms an unfilled area between the outermost bottom surface of the gasket, the bottom channel surface, and side walls of the anti-filiform corrosion channel.

17. The method according to claim 15, including forming the first surface as a flat surface extending between first and second edges, and spacing the open end of the anti-filiform corrosion channel apart from the first and second edges to interrupt filiform corrosion extending inward from one of the first and second edges, and wherein gasket material is sandwiched between the first surface and the second surface along the sides of the anti-filiform corrosion channel such that the cover is spaced apart from the battery tray along the sides.

18. The method according to claim 15, wherein the battery tray is configured to support a plurality of high voltage vehicle batteries, and including forming the battery tray to have a base wall with a plurality of side walls extending outwardly from peripheral edges of the base wall, and forming a sealing land at an upper edge area of at least one side wall to provide the first surface.

19. The method according to claim 18, including positioning the anti-filiform corrosion channel in a generally central location on the sealing land.

20. A method comprising:
providing a battery tray having a first surface, a cover having a second surface facing the first surface, and a gasket positioned between the first and second surfaces to provide a seal interface;
forming an anti-filiform corrosion channel within the battery tray such that the anti-filiform corrosion channel has an enclosed end forming a bottom channel surface and an open end that is open to the first surface;
positioning the gasket to cover the open end of the anti-filiform corrosion channel such that the anti-filiform corrosion channel provides an air pocket that comprises an unfilled area between an outermost bottom surface of the gasket that overlaps the anti-filiform corrosion channel, the bottom channel surface, and side walls of the anti-filiform corrosion channel; and
attaching the cover to the battery tray to compress the gasket between the first and second surfaces such that the gasket only partially protrudes into the anti-filiform corrosion channel, leaving the bottom channel surface of the anti-filiform corrosion channel free from any contact with gasket material, and wherein gasket material is sandwiched between the first surface and the second surface along upwardly facing surfaces extending along sides of the anti-filiform corrosion channel such that the cover is spaced apart from the battery tray along the upwardly facing surfaces extending along the sides.

21. An apparatus, comprising:
a battery tray having a first surface;
a cover having a second surface facing the first surface;
an anti-filiform corrosion channel formed within the battery tray, the anti-filiform corrosion channel having an enclosed end defining a bottom channel surface and an open end that is open to the first surface;
a gasket positioned between the first and second surfaces to provide a seal interface, wherein the gasket is positioned to cover the open end of the anti-filiform corrosion channel, and wherein the gasket is compressed between the first surface and the second surface such that the gasket only partially protrudes into the anti-filiform corrosion channel, leaving the bottom channel surface of the anti-filiform corrosion channel free from any contact with gasket material; and
the anti-filiform corrosion channel provides an air pocket that comprises an unfilled area between an outermost bottom surface of the gasket that overlaps the anti-filiform corrosion channel, the bottom channel surface, and side walls of the anti-filiform corrosion channel; and
wherein gasket material is sandwiched between the first surface and the second surface along upwardly facing surfaces extending along sides of the anti-filiform corrosion channel such that the cover is spaced apart from the battery tray along the upwardly facing surfaces extending along the sides.

22. An apparatus, comprising:
a first component having a first surface;
a second component having a second surface facing the first surface, wherein the first component comprises a battery tray and the second component comprises a cover;
a channel formed within the first component and open to the first surface;
a seal member positioned between the first and second surfaces to provide a seal interface, wherein the seal member is positioned to cover the channel, and wherein the seal member is compressed between the first surface and the second surface such that the seal member only partially protrudes into the channel, leaving a bottom channel surface of the channel free from any contact with sealing material; and wherein:
the channel provides an air pocket that comprises an unfilled area between an outermost bottom surface of the seal member that overlaps the channel, the bottom channel surface, and side walls of the channel; and
wherein sealing material of the seal member is sandwiched between the first surface and the second surface along upwardly facing surfaces extending along sides of the channel such that the first component is spaced apart from the second component along the upwardly facing surfaces extending along the sides.

* * * * *